(12) United States Patent
Parasuram et al.

(10) Patent No.: US 11,460,846 B2
(45) Date of Patent: Oct. 4, 2022

(54) UNMARKED CROSSWALKS FOR AUTONOMOUS VEHICLES

(71) Applicant: Waymo LLC, Mountain View, CA (US)

(72) Inventors: Aishwarya Parasuram, Sunnyvale, CA (US); Jennifer Iglesias, San Francisco, CA (US); Ioan-Alexandru Sucan, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 267 days.

(21) Appl. No.: 16/680,619

(22) Filed: Nov. 12, 2019

(65) Prior Publication Data

US 2021/0141380 A1    May 13, 2021

(51) Int. Cl.
| | |
|---|---|
| *G01C 22/00* | (2006.01) |
| *G05D 1/00* | (2006.01) |
| *G05D 1/02* | (2020.01) |
| *G06V 20/58* | (2022.01) |
| *G06V 40/10* | (2022.01) |

(52) U.S. Cl.
CPC ......... *G05D 1/0214* (2013.01); *G05D 1/0088* (2013.01); *G06V 20/584* (2022.01); *G06V 40/10* (2022.01); *G05D 2201/0213* (2013.01)

(58) Field of Classification Search
CPC ............... G05D 1/0214; G05D 1/0088; G05D 2201/0213; G06K 9/00362; G06K 9/00825
USPC ......................................................... 701/23
See application file for complete search history.

(56) References Cited

U.S. PATENT DOCUMENTS

| | | | |
|---|---|---|---|
| 8,954,252 B1 | 2/2015 | Urmson et al. | |
| 9,457,807 B2 | 10/2016 | Lee et al. | |
| 9,509,962 B2 | 11/2016 | Chundrlik et al. | |
| 9,534,910 B2 | 1/2017 | Okumura | |
| 9,764,736 B2 | 9/2017 | Prokhorov | |
| 2017/0124476 A1* | 5/2017 | Levinson | G01S 17/931 |
| 2017/0316333 A1* | 11/2017 | Levinson | G05D 1/0248 |
| 2020/0189573 A1* | 6/2020 | King | G05D 1/0223 |
| 2020/0209864 A1* | 7/2020 | Chen | G05D 1/0221 |

\* cited by examiner

*Primary Examiner* — Mahmoud S Ismail
(74) *Attorney, Agent, or Firm* — Botos Churchill IP Law

(57) ABSTRACT

Aspects of the disclosure provide for controlling an autonomous vehicle having an autonomous driving mode. For instance, sensor data generated by a perception system of a vehicle may be received. The sensor data identifying objects in an environment of the vehicle. A trajectory corresponding to a future path of the vehicle may be received. That the vehicle is approaching an unmarked crosswalk situation may be determined based on the trajectory and the sensor data. In response to the determination, an area for an unmarked crosswalk is identified. The vehicle may be controlled in the autonomous driving mode based on the determination and the area.

21 Claims, 18 Drawing Sheets

300

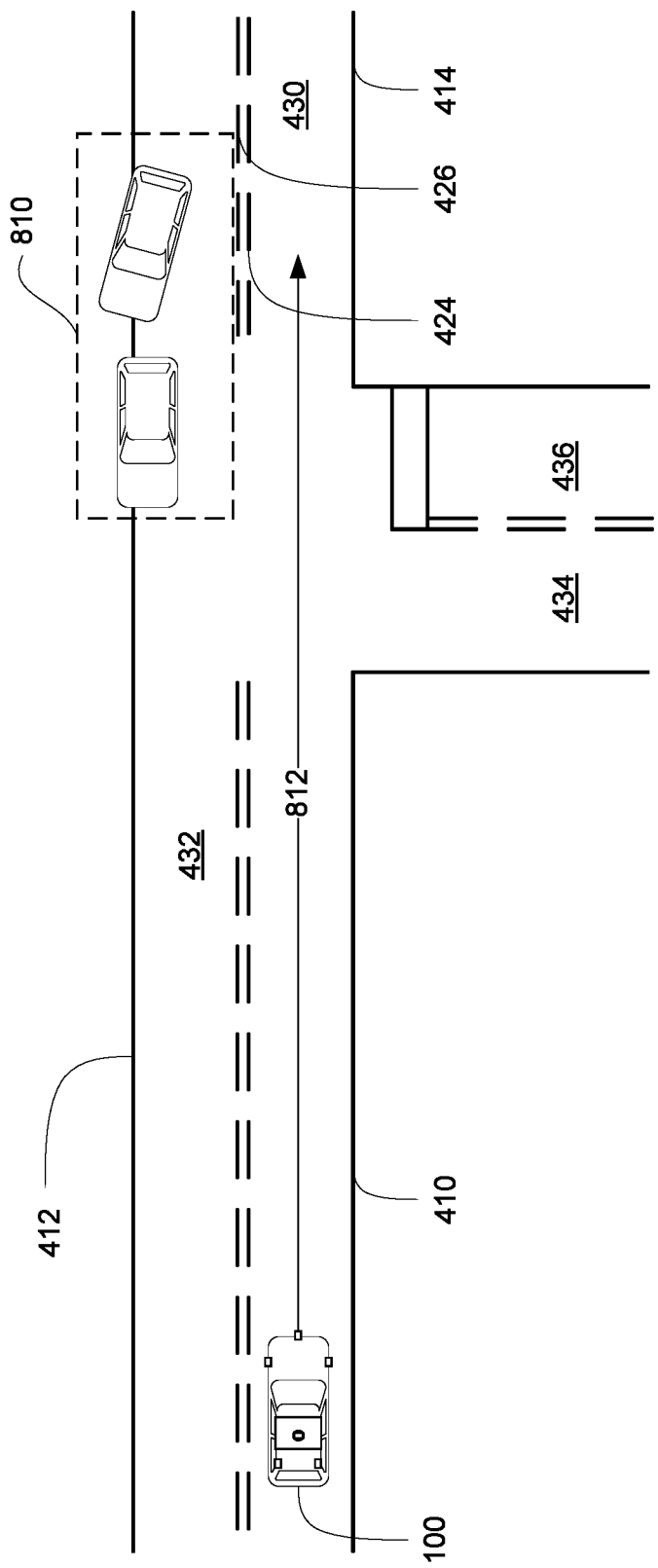

UNMARKED CROSSWALKS FOR AUTONOMOUS VEHICLES

BACKGROUND

Autonomous vehicles, such as vehicles which do not require a human driver when operating in an autonomous driving mode, may be used to aid in the transport of passengers or items from one location to another. In some instances, these vehicles may need to change from the autonomous driving mode, where the vehicle's computing devices control the steering, acceleration and deceleration of the vehicle to a semi-autonomous driving mode, where there is shared control between the vehicle's computing devices and a driver of the vehicle (e.g. the driver may control the steering of the vehicle via a steering input while the vehicle's computing devices control the acceleration and deceleration of the vehicle), or to a manual driving mode where a driver controls the steering, acceleration and deceleration of the vehicle via steering, acceleration, and deceleration inputs.

These vehicles may also be equipped with systems for responding to crosswalks. Crosswalks may be identified in map information, via visual detection methods using sensor data generated by a perception system of an autonomous vehicle, or a combination of both. Once a crosswalk is identified, the vehicle may engage certain crosswalk behaviors when approaching crosswalks such as occlusion reasoning, more cautious behaviors, assuming certain objects may be pedestrians even if a confidence in such determinations would otherwise be considered too low, etc. Such behaviors may enable the vehicle to safely maneuver through the crosswalk.

BRIEF DESCRIPTION OF THE DRAWINGS

FIGS. 8A-8B is an example situation and area of an unmarked crosswalk in accordance with aspects of the disclosure.

SUMMARY

Figure 1:
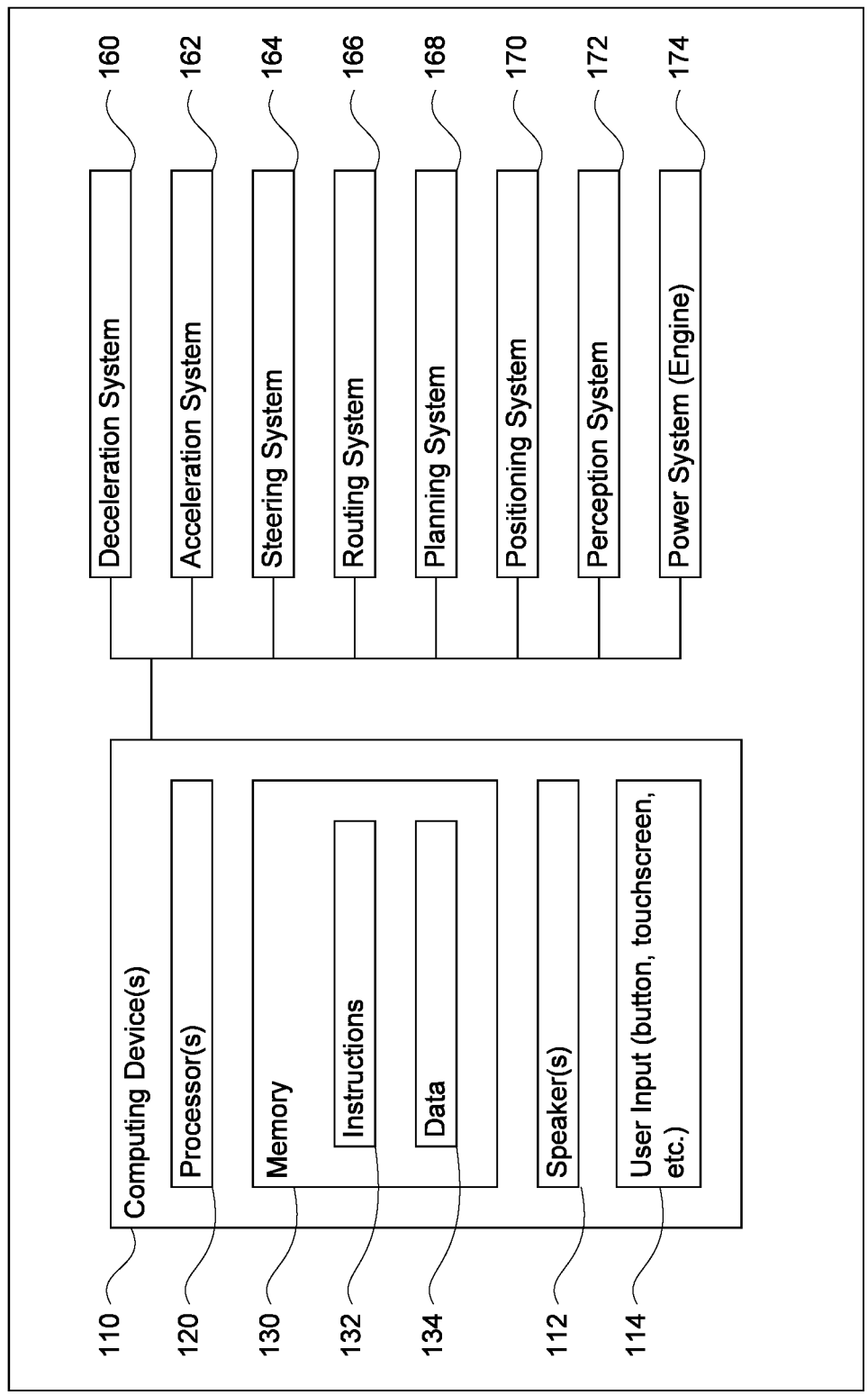
FIG. 1 is a functional diagram of an example vehicle in accordance with an exemplary embodiment.

One aspect of the disclosure provides a method for controlling an autonomous vehicle having an autonomous driving mode. The method includes receiving, by one or more processors of the vehicle, sensor data generated by a perception system of a vehicle, the sensor data identifying objects in an environment of the vehicle; receiving, by the one or more processors of the vehicle, a trajectory corresponding to a future path of the vehicle; determining, by the one or more processors of the vehicle, that the vehicle is approaching an unmarked crosswalk situation based on the trajectory and the sensor data; in response to the determination, identifying, by the one or more processors of the vehicle, an area for an unmarked crosswalk; and controlling, by the one or more processors of the vehicle, the vehicle in the autonomous driving mode based on the determination and the area.

In one example, the unmarked crosswalk situation corresponds to a situation in which there is no marked crosswalk in the environment. In this example, the unmarked crosswalk situation corresponds to a situation in which there is no marked crosswalk in any pre-stored map information used to control the vehicle in the autonomous driving mode. In another example, determining that the vehicle is approaching an unmarked crosswalk situation includes determining whether the environment includes a school zone. In another example, determining that the vehicle is approaching an unmarked crosswalk situation includes determining whether the environment includes a school bus. In this example, identifying the area is based on a location of the school bus. In another example, determining that the vehicle is approaching an unmarked crosswalk situation includes determining whether the environment includes a construction zone. In this example, identifying the area is based on a polygon of the construction zone. In another example, determining that the vehicle is approaching an unmarked crosswalk situation includes determining whether the environment includes one or more persons directing traffic. In this example, identifying the area is based on a location of the one or more persons directing traffic. In another example, determining that the vehicle is approaching an unmarked crosswalk situation includes determining whether the environment includes a traffic accident. In this example, identifying the area is based on a polygon for an accident zone of the accident. In another example, determining that the vehicle is approaching an unmarked crosswalk situation includes determining whether the environment includes one or more emergency vehicles. In this example, identifying the area is based on a location of a first of the plurality of emergency vehicles. In addition, the method also includes identifying a second area based on a location of a second of the plurality of emergency vehicles, and wherein controlling the vehicle is further based on the second area. In another example, controlling the vehicle includes giving a pedestrian in the area precedence for crossing a road with respect to the vehicle. In another example, controlling the vehicle includes yielding to a pedestrian on a side of the road outside of the area. In another example, controlling the vehicle includes using occlusion reasoning for the area in order to predict one or more potentially occluded pedestrians. In another example, controlling the vehicle includes allowing the vehicle's computing devices to increase allocation of computing resources for detecting and responding to pedestrians as the vehicle approaches the area.

DETAILED DESCRIPTION

Overview

The technology relates to engaging certain behaviors for autonomous vehicles. As noted above, crosswalks may be identified in map information, via visual detection methods using sensor data generated by a perception system of an autonomous vehicle, or a combination of both. Once a crosswalk is identified, the vehicle may engage certain crosswalk behaviors when approaching crosswalks such as occlusion reasoning, more cautious behaviors, assuming certain objects may be pedestrians even if a confidence in such determinations would otherwise be considered too low, etc. Such behaviors may enable the vehicle to safely maneuver through the crosswalk.

However, such behaviors may be useful in many other situations including those where pedestrians are likely to cross a road on which the vehicle is traveling even in situations where there is no actual crosswalk in the map information or on the road. In some such situations, the pedestrian may even have precedence, but without being able to engage the aforementioned crosswalk behaviors. To address this, the vehicle may be programmed to detect such situations and identify areas as unmarked, contextual, hypothetical, or virtual crosswalks (even though there is no actual crosswalk) in order to engage the crosswalk behaviors.

As the vehicle drives through its environment, an unmarked crosswalk detection software module may process information from the map information as well as sensor data generated by the perception system to determine whether the vehicle is in or approaching an unmarked crosswalk situation. For instance, the detection module may determine whether the vehicle's trajectory passes through or nearby a location in a way that satisfies one or more predetermined characteristics. These characteristics may relate to the context in which the vehicle is driving and/or the current time (e.g. date and/or time). In order to make the detector as effective as possible, the detection module may be run continuously rather than only at specific locations or times.

Once an unmarked crosswalk situation is identified, the vehicle's computing devices may identify an area corresponding to an unmarked crosswalk. This area may be determined based on the satisfied one or more predetermined characteristics and/or the type of the unmarked crosswalk situation. In other words, these details may be used to identify reference points where the crosswalk should start and end, and then a polygon may be drawn from these points to the locations of road edges or beyond. Alternatively, a polygon may be drawn using the reference points or around another polygon as discussed further below. Once an area for an unmarked crosswalk is determined, certain behaviors for crosswalks may be engaged or otherwise "turned on" to enable the vehicle to react to the unmarked crosswalk as if it were an actual crosswalk.

The features described herein may enable an autonomous vehicle to identify situations in which pedestrians may be likely to be crossing, attempting to cross, or simply walking in a road. As such, the vehicle is able to automatically engage certain behaviors useful for crosswalks in instances where such behaviors would be safer, more helpful, and appropriate even if not legally required. Overall, the features described herein may greatly improve safety in situations where pedestrians could be crossing a road outside of a crosswalk.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 2:
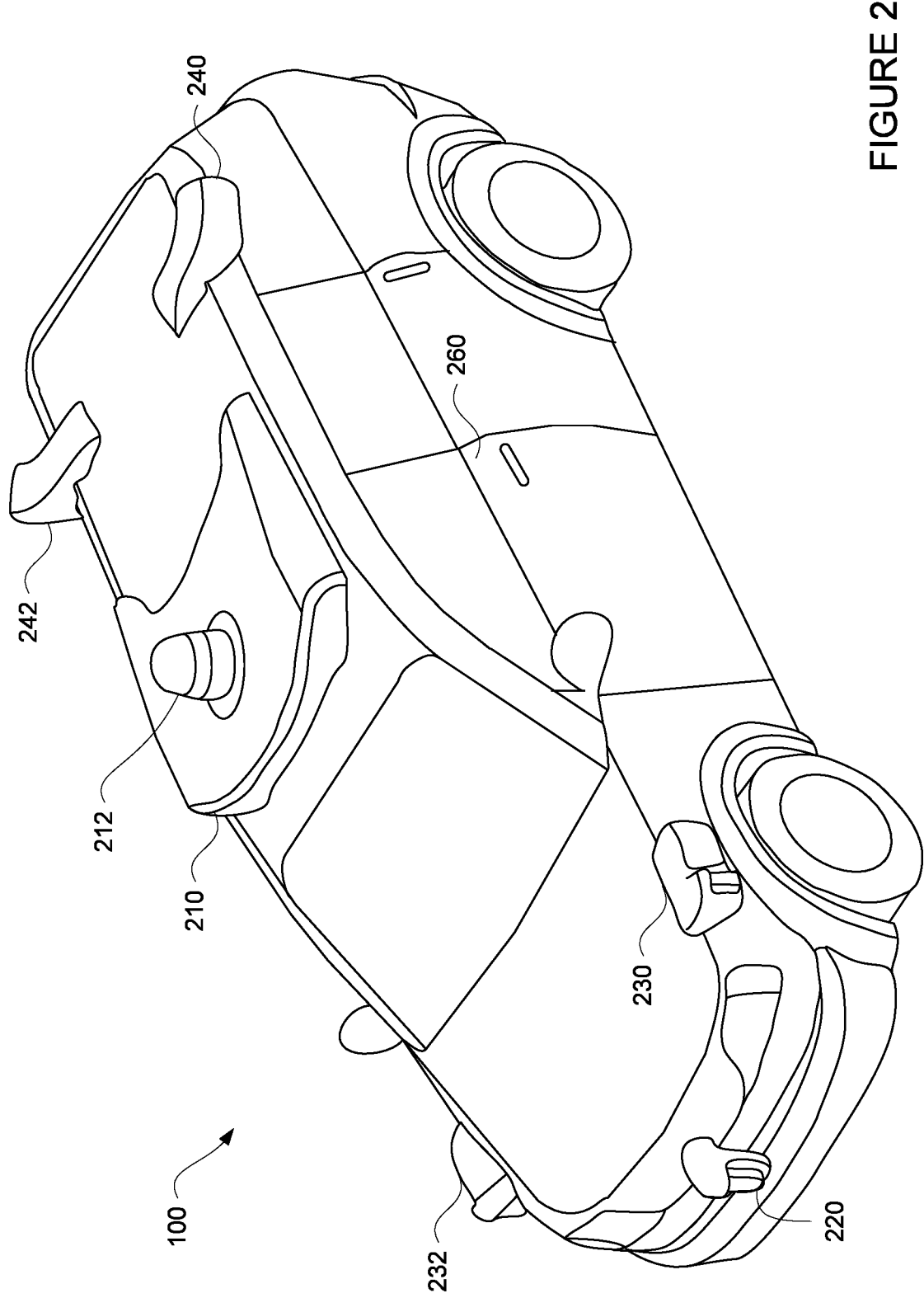
FIG. 2 is an example diagram of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 3:
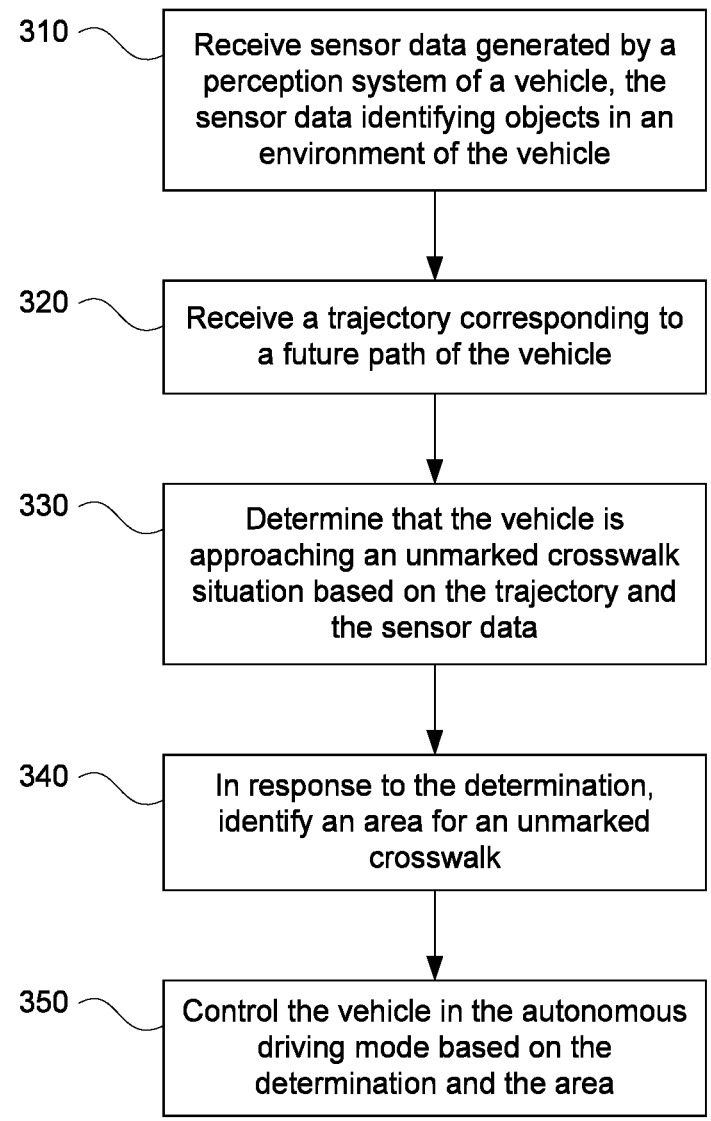
FIG. 3 is an example flow diagram in accordance with aspects of the disclosure.

FIG. 3 provides an example flow diagram 300 for controlling a vehicle in an autonomous driving mode which may be performed by one or more processors of computing devices, such as one or more processors 120 of computing devices 110. For instance, as shown in block 310, sensor data generated by a perception system of a vehicle is received. This sensor data identifies objects in an environment of the vehicle. For example, as noted above, the perception system 172 may use the various sensors of the vehicle to generate sensor data. The perception system 172 may then send this sensor data to the computing devices 110.

At block 320, a trajectory corresponding to a future path of the vehicle is received. For instance, as noted above, the planner system 168 may use the sensor data, map information, as well as other data to generate a trajectory for the vehicle to follow in order to enable the vehicle to progress along a route (generated by the routing system 166) in order to reach a destination. The planner system 168 may then send this trajectory to the computing devices 110.

At block 330, that the vehicle is approaching an unmarked crosswalk situation is determined based on the trajectory and the sensor data. For instance, as noted above, as the vehicle drives through its environment, an unmarked crosswalk detection software module of the memory 130 may process information from the map information described above as well as sensor data generated by the perception system 172 to determine whether the vehicle is in or approaching an unmarked crosswalk situation. In order to make the detector as effective as possible, the unmarked crosswalk detection software module may be run continuously rather than only at specific locations or times. The detection module may determine whether the vehicle's trajectory passes through or nearby a location in a way that satisfies one or more predetermined characteristics stored in the memory 130.

These characteristics may relate to the context in which the vehicle is driving and/or the current time (e.g. date and/or time). For example, the detection model may determine whether the trajectory will cause the vehicle to pass through an intersection without a marked crosswalk, pass nearby a school vehicle (e.g. a school van), pass nearby one or more persons directing traffic, pass through a construction zone, pass through an area where there are one or more emergency vehicles nearby, pass nearby a traffic accident (e.g. two vehicles colliding or a vehicle colliding with another object), pass through a school zone on a particular date or time of day or when school zone sign lights are flashing, a residential area on a particular date or time of day, larger parking lots (e.g. shopping centers, hospitals, parks, etc.), or any other situations in which pedestrians are likely to be crossing a road outside of a crosswalk. As noted above, many of these features, such as intersections, construction zones, school zones, residential areas, parking lots, etc. may be identified in the map information. Those features and others, including emergency vehicles, traffic accidents, etc. may also be detected in real time using detection software modules as described above.

Figure 4:
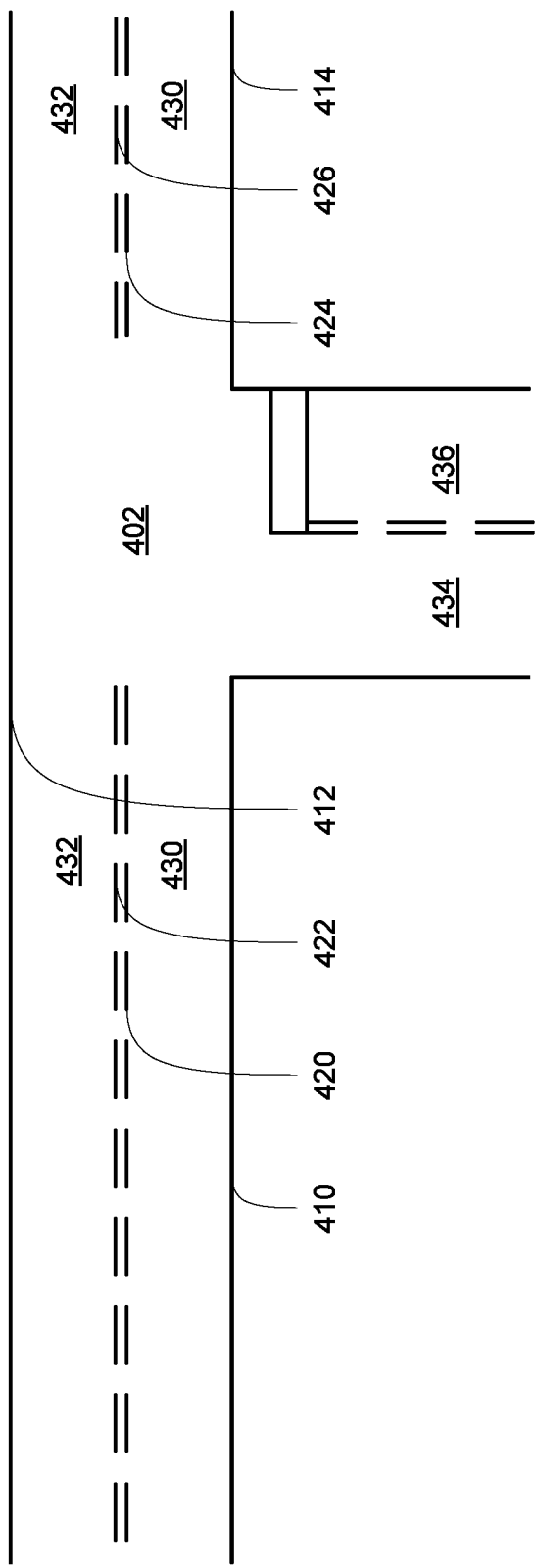
FIG. 4 is an example bird's eye view of a section of roadway 400 in accordance with aspects of the disclosure.

FIG. 4 is an example bird's eye view of a section of roadway 400 which will be used for demonstration purposes. The roadway 400 includes an intersection 402 as well as fog lines 410, 412, 414 which define the edges of a roadway including lanes 430, 432 divided by lane lines 420, 422, 424, 426. In this example, lane 430 meets up with a side street including lanes 434, 436. FIGS. 5A-10B provide example situations in which the vehicle 100 is approaching an unmarked crosswalk situation in the area of roadway 400. In each of these examples, there is no crosswalk identified in the map information for the area around the vehicle (e.g. what is depicted in each of three examples).

Figure 5A:
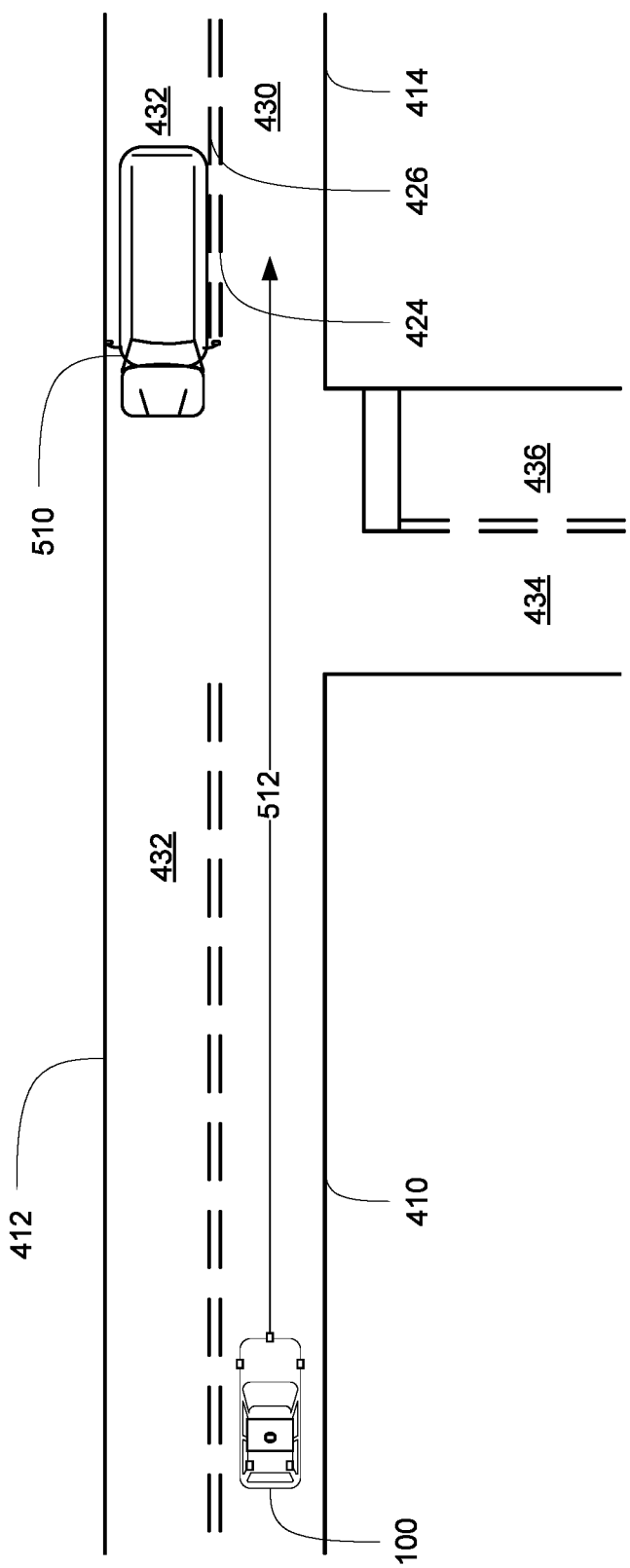
FIGS. 5A-5C is an example situation and areas of an unmarked crosswalk in accordance with aspects of the disclosure.

FIG. 5A provides an example situation 500 in which vehicle 100 is driving in lane 430 and approaching a stopped school bus 510 in lane 432. The school bus may be identified, for instance, by the school bus detection software module described above, and the features of the school bus, such as that the school bus is stopped may be determined by the perception system 172. In this example, the vehicle's trajectory 512 will pass by the school bus 510. Thus, the computing devices 110 may determine that the vehicle 100 is approaching an unmarked crosswalk situation.

Figure 6A:
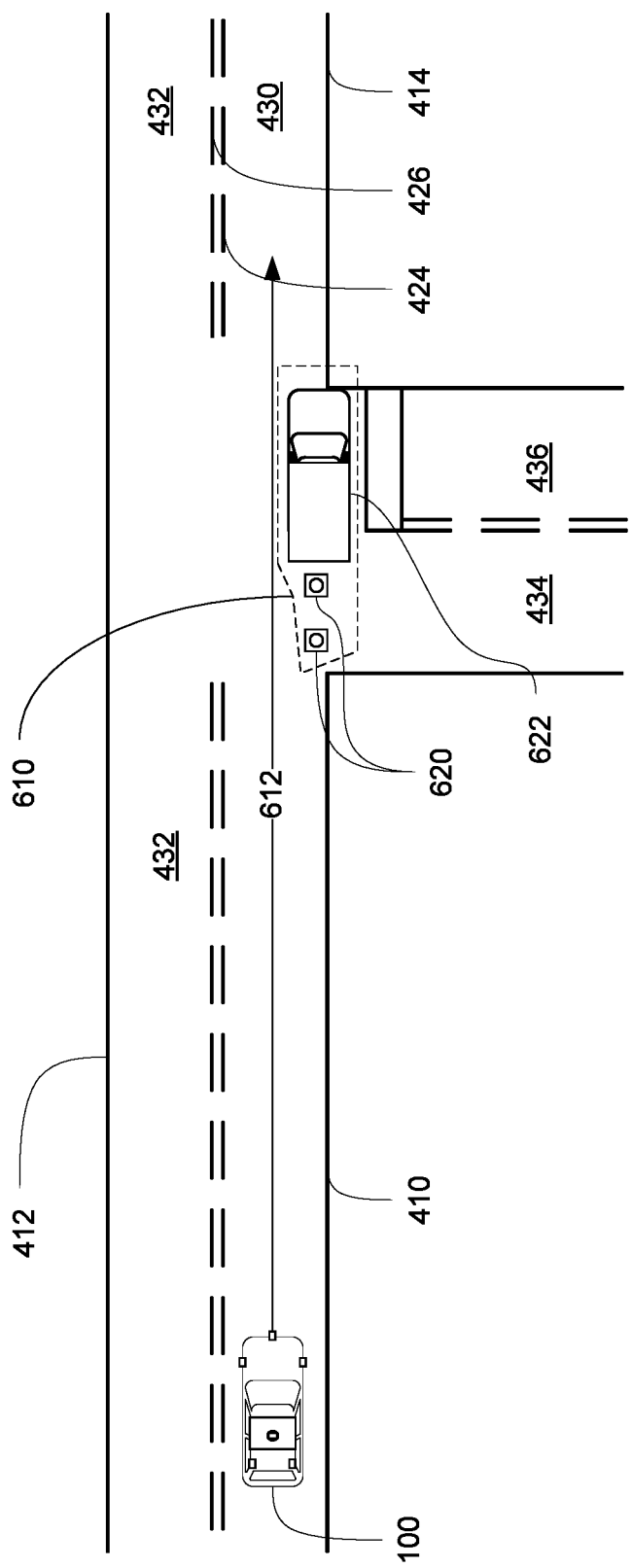
FIGS. 6A-6B is an example situation and area of unmarked crosswalks in accordance with aspects of the disclosure.

FIG. 6A provides an example situation 600 in which vehicle 100 is driving in lane 430 approaching a construction zone 610, for instance, identified by construction zone detection software module described above or in the map information. The constructions zone 610 includes construction zone objects 620 (e.g. cones), 622 (e.g. a construction vehicle). In this example, the vehicle's trajectory 612 will pass through the construction zone 610. Thus, the computing devices 110 may determine that the vehicle 100 is approaching an unmarked crosswalk situation.

Figure 7A:
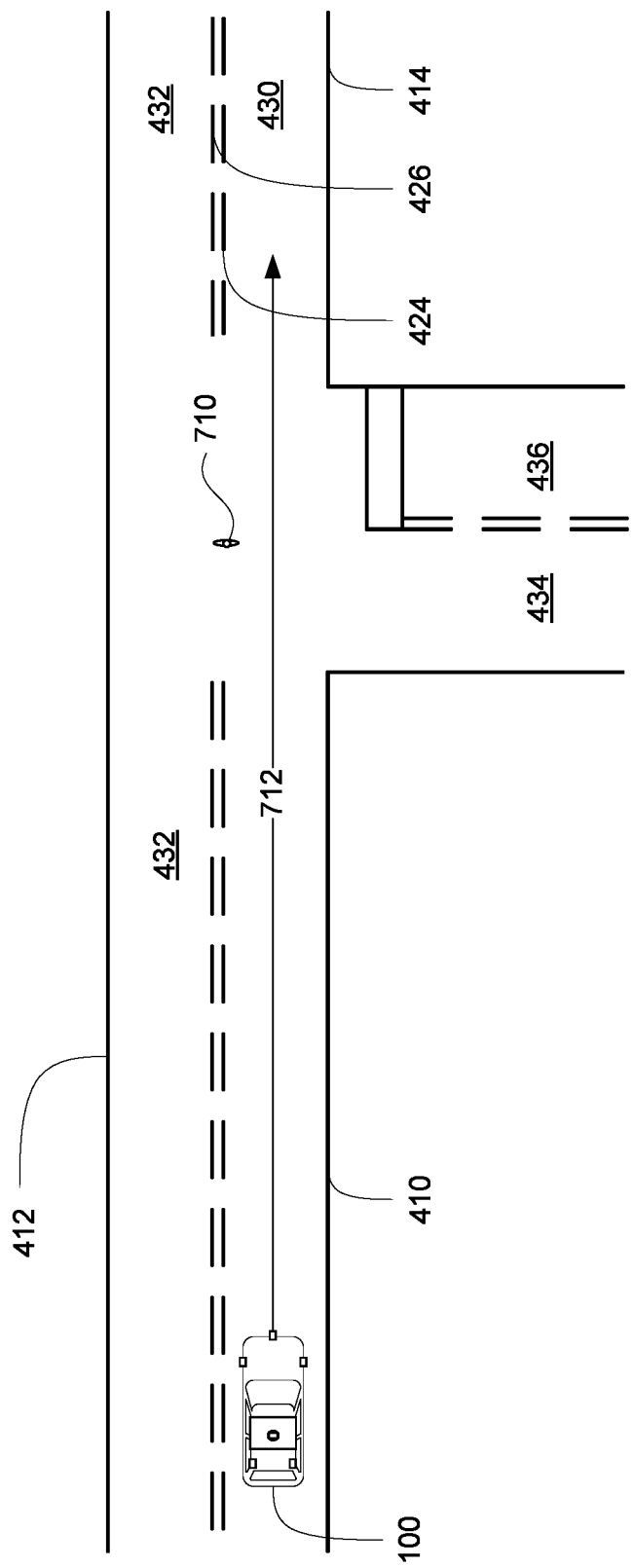
FIGS. 7A-7C is an example situation and areas of unmarked crosswalks in accordance with aspects of the disclosure.

FIG. 7A provides an example situation 700 in which vehicle 100 is driving in lane 430 and approaching a person directing traffic 710, for instance, identified by the detection software module for detecting persons directing traffic described above. In this example, the vehicle's trajectory 712 will pass by the persons directing traffic 710. Thus, the computing devices 110 may determine that the vehicle 100 is approaching an unmarked crosswalk situation.

Figure 8B:
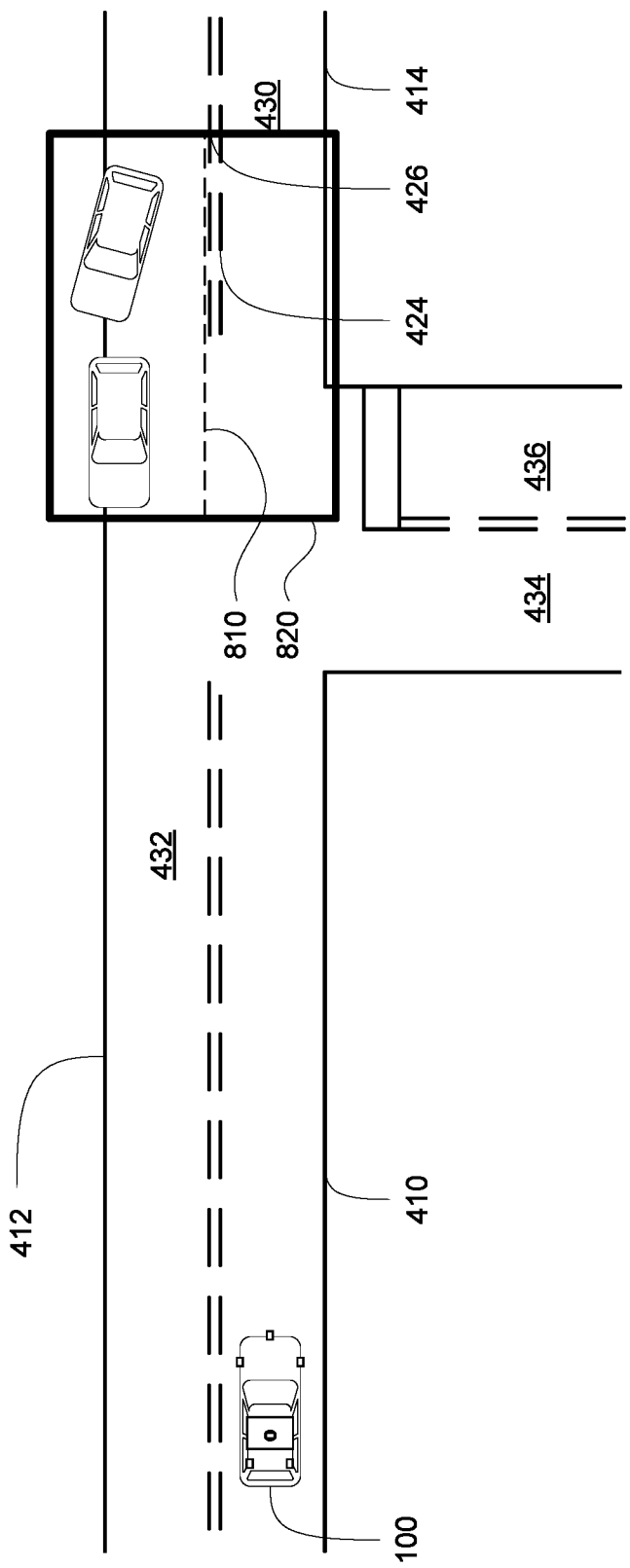

FIG. 8A provides an example situation 800 in which vehicle 100 is driving in lane 430 and approaching a traffic accident 810, for instance, identified by the traffic accident detection software module described above. In this example, the vehicle's trajectory 812 will pass by the traffic accident 810. Thus, the computing devices 110 may determine that the vehicle is approaching an unmarked crosswalk situation.

Figure 9A:
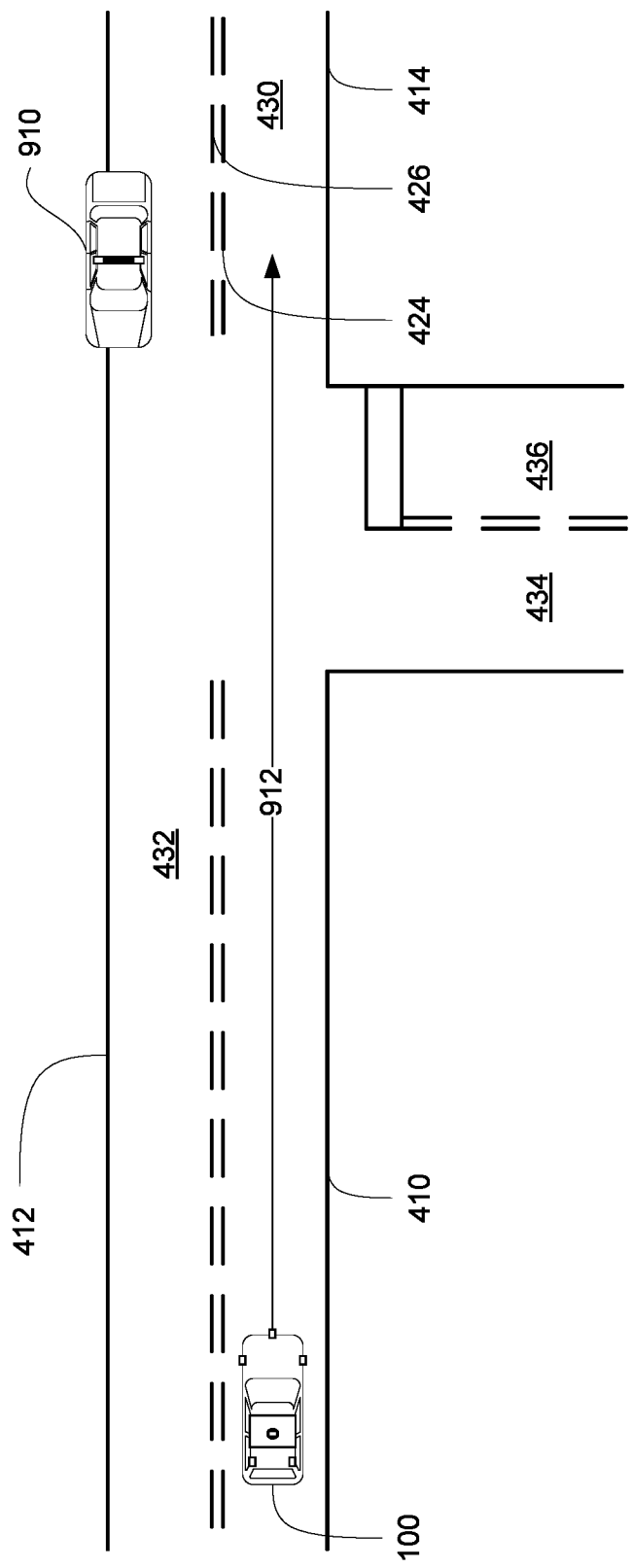
FIGS. 9A-9B is an example situation and area of an unmarked crosswalk in accordance with aspects of the disclosure.

FIG. 9A provides an example situation 600 in which vehicle 100 is in lane 430 and approaching an emergency vehicle 910, for instance, identified by the emergency vehicle detection software module described above. In this example, the vehicle's trajectory 912 will pass by the emergency vehicle 910. Thus, the computing devices 110 may determine that the vehicle is approaching an unmarked crosswalk situation.

Figure 10A:
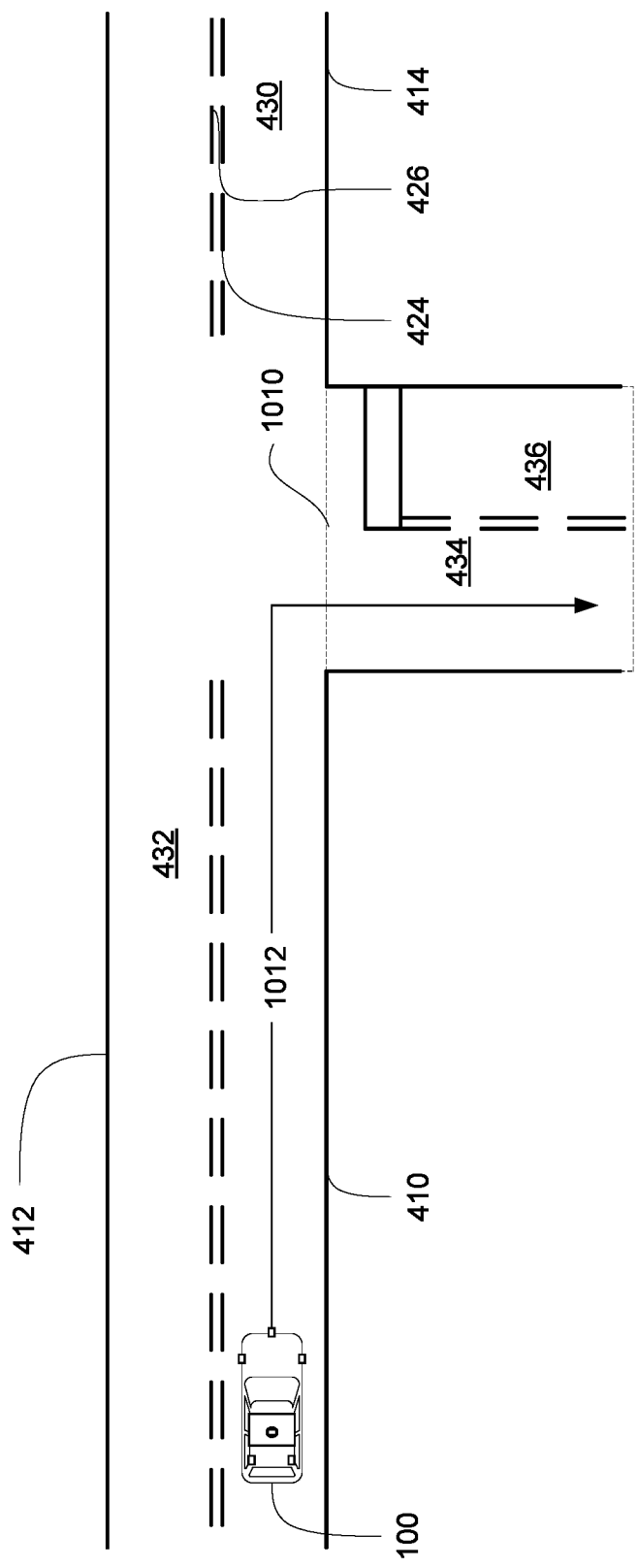
FIGS. 10A-10B is an example situation and area of an unmarked crosswalk in accordance with aspects of the disclosure.
Figure 10B:
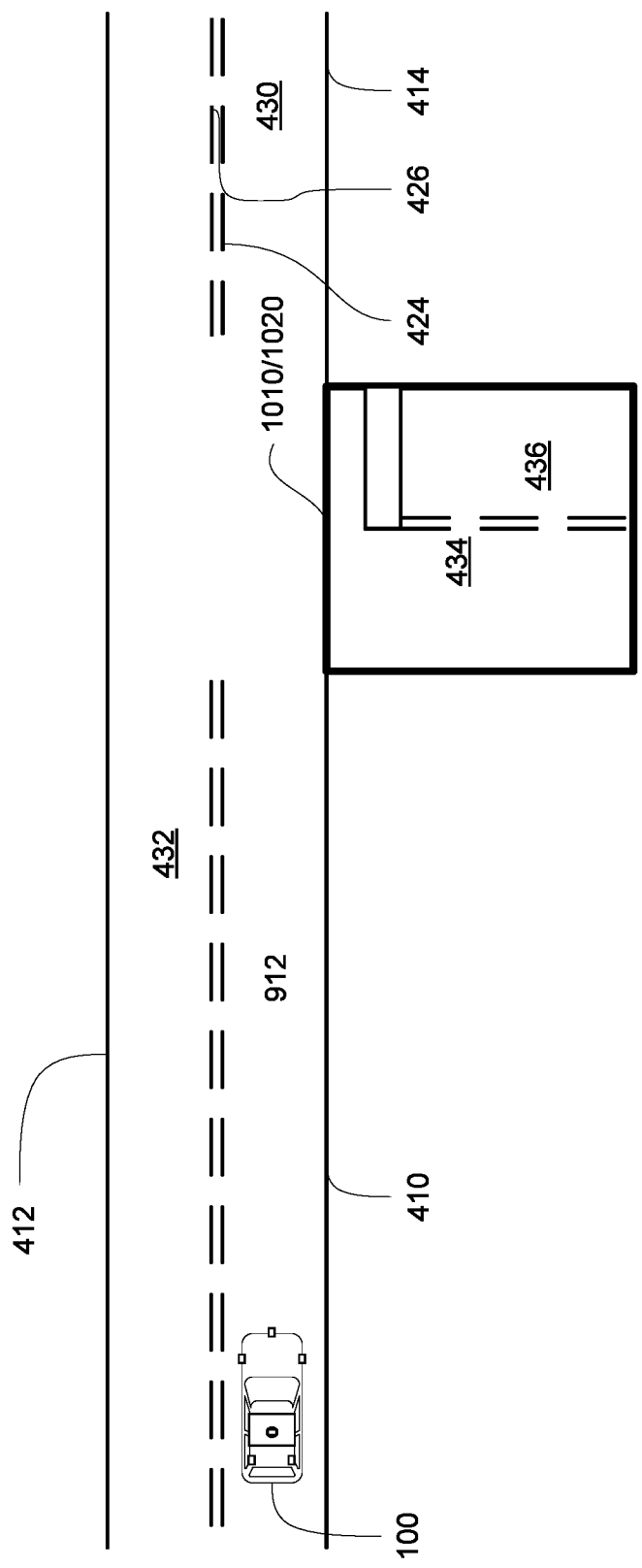

FIG. 10A provides an example situation 1000 in which vehicle 100 is in a residential area 1010, for instance, identified in the map information. In this example, the vehicle's trajectory 1012 will pass through the residential area 1010 including lanes 434, 436. Thus, the computing devices 110 may determine that the vehicle is approaching an unmarked crosswalk situation.

Returning to FIG. 3, at block 340, in response to the determination, an area for an unmarked crosswalk is identified. For instance, once an unmarked crosswalk situation is determined, the vehicle's computing devices may identify an area corresponding to an unmarked crosswalk. This area may be determined based on the satisfied one or more predetermined characteristics and/or the type of the unmarked crosswalk situation. In other words, these details may be used to identify reference points where the crosswalk should start and end, and then a polygon may be drawn from these points to the locations of road edges or beyond. Alternatively, a polygon may be drawn using the reference points or around another polygon as discussed further below.

For instance, in the presence of active school buses or within school zones, children may be expected to cross the road in the vicinity of an active stopped school bus, or at a school zone even if there is not a mapped or painted crosswalk. As such, the area for the unmarked crosswalk may be identified using points corresponding to the front and back of the school bus as a reference for drawing a larger rectangular region around the school bus and across the road. In this regard, the rectangle may include some additional buffer area or distance in front of and behind the school bus, such as an additional 3-meter distance or more or less. The term "across the width of the road" as used herein may include not only lanes of the road, but also beyond the edges of the roadway (e.g. a shoulder area), and even some small distance beyond the shoulder area in some instances. Alternatively, rather than a single crosswalk, a pair of areas for unmarked crosswalks may be determined, one in front of the bus and one behind.

Figure 5B:
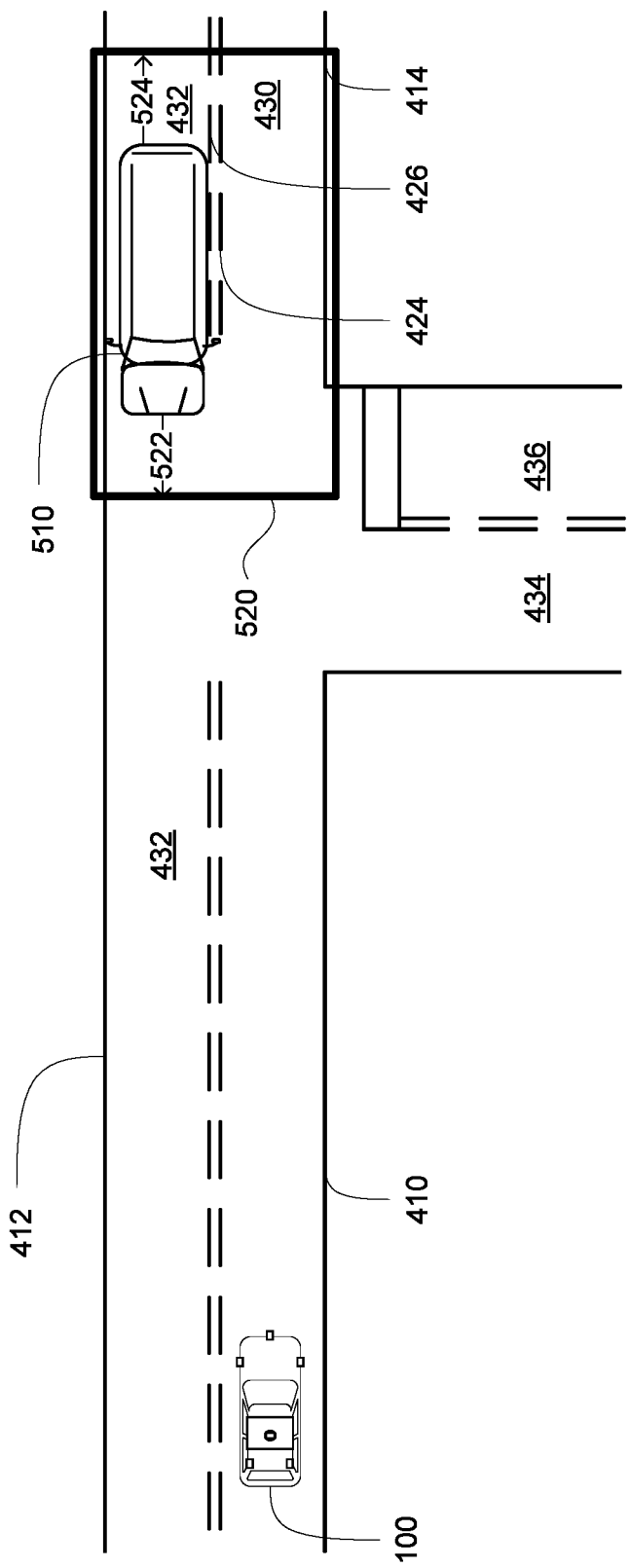

Returning to the example of FIG. 5A, as shown in FIG. 5B, an area 520 for an unmarked crosswalk may be determined by using corners on the front and back of the school bus 510 (or the corners of a bounding box representing the volume of space occupied by the school bus) as a reference for drawing a larger rectangular region around the school bus and across the width of both lanes 430 and 432. Arrows 522, 524 represent the additional buffer distance. In this example, the area 520 extends beyond the edges of the roadway defined by the fog lines 412, 414.

Figure 5C:
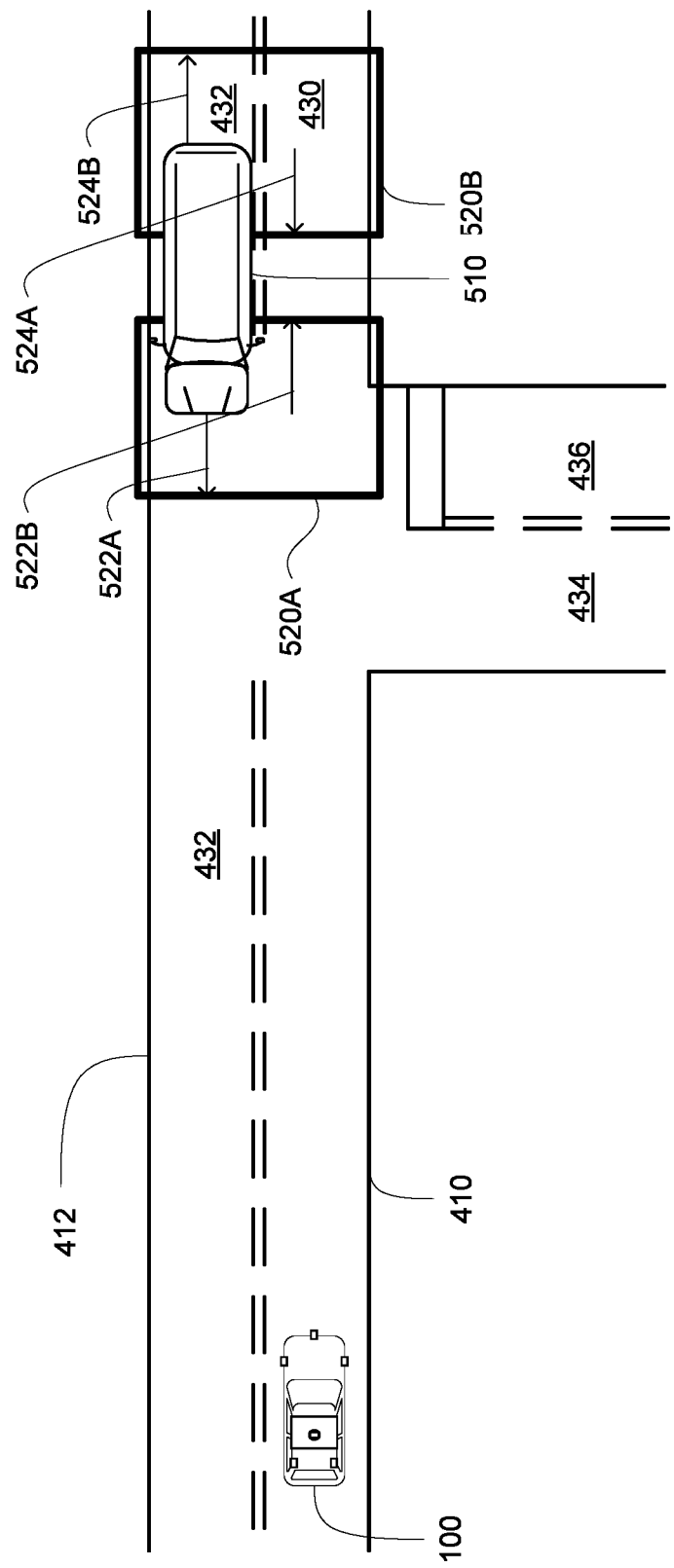

Alternatively, as shown in FIG. 5C, areas 520A and 520B for a pair of unmarked crosswalks may be determined by using corners on the front and back of the school bus 510 (or the corners of a bounding box representing the volume of space occupied by the school bus) as a reference for drawing a rectangular region around the front and rear of the school bus and across the width of both lanes 430 and 432. Arrows 522A, 522B, 524A, 524B represent the additional forward (A) and reverse (B) buffer distances from the front and back corners, respectively. In this example, the areas 520A, 520B extend beyond the edges of the roadway defined by the fog lines 412, 414.

As another instance, in construction zones, construction workers are seen to walk across the road even in the absence of mapped crosswalks. As such, the area for the unmarked crosswalk may be identified to correspond to an entire area of the construction zone or an area that is some predetermined distance larger than the area of the construction zone. Such areas of construction zones may be identified as a polygon by another detector of the vehicle which identifies areas for construction zones. Sometimes, cones or pylons are placed to indicate the construction area. In such instances, the area may be identified by drawing a polygon around the region cordoned off by the cones or pylons, and extending it across the road, and even some small distance beyond the shoulder area in some instances.

Figure 6B:
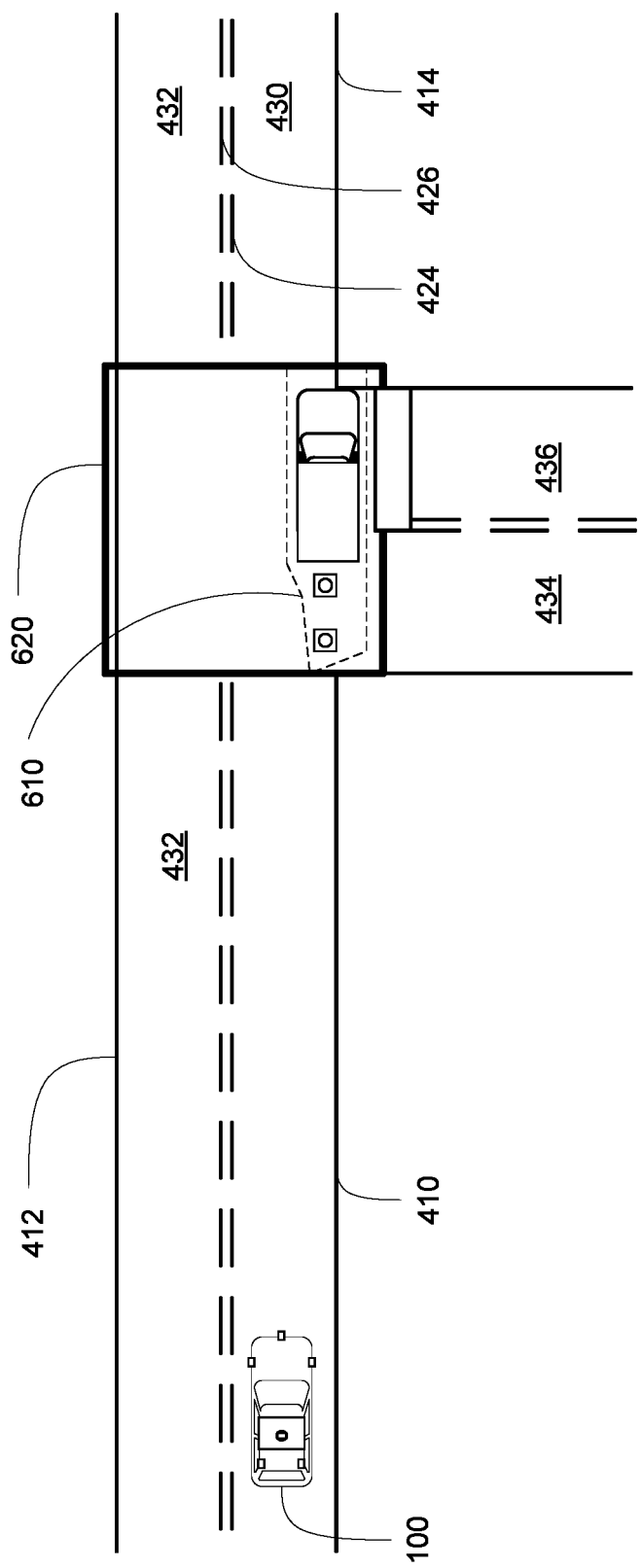

Returning to the example of FIG. 6A, as shown in FIG. 6B, area 620 may be determined by drawing a polygon around the construction zone 610 and extending that polygon across the lane 432. In this example, the polygon is slightly larger than the construction zone 610, though the polygon may be the same size as the construction zone. In this example, the area 620 extends beyond the edges of the roadway defined by the fog lines 412, 414.

As another instance, where one or more persons, such as police officers or other pedestrian, is directing traffic, pedestrians might be more likely to cross. This may be especially true near school zones or events such as concerts, sporting events, etc. As such, the area for the unmarked crosswalk may be determined based on a point corresponding to the location of the pedestrian, for instance, by drawing a rectangle of a particular size large enough to go across the road around the one or more persons directing traffic. In situations where a person is directing traffic outside of an intersection, the rectangle may have a particular width of 5 meters or more or less, a length enough to go across the road, and be centered around the person directing traffic. In situations where a person directing traffic in an intersection, an area of an unmarked crosswalk may be a polygon that corresponds to the entire area of the intersection and/or the aforementioned rectangle of a particular width centered around the pedestrian whichever is greater. The area of the intersection may be defined in the map information or determined by the computing devices 110 from sensor data received from the perception system 172.

Figure 7B:
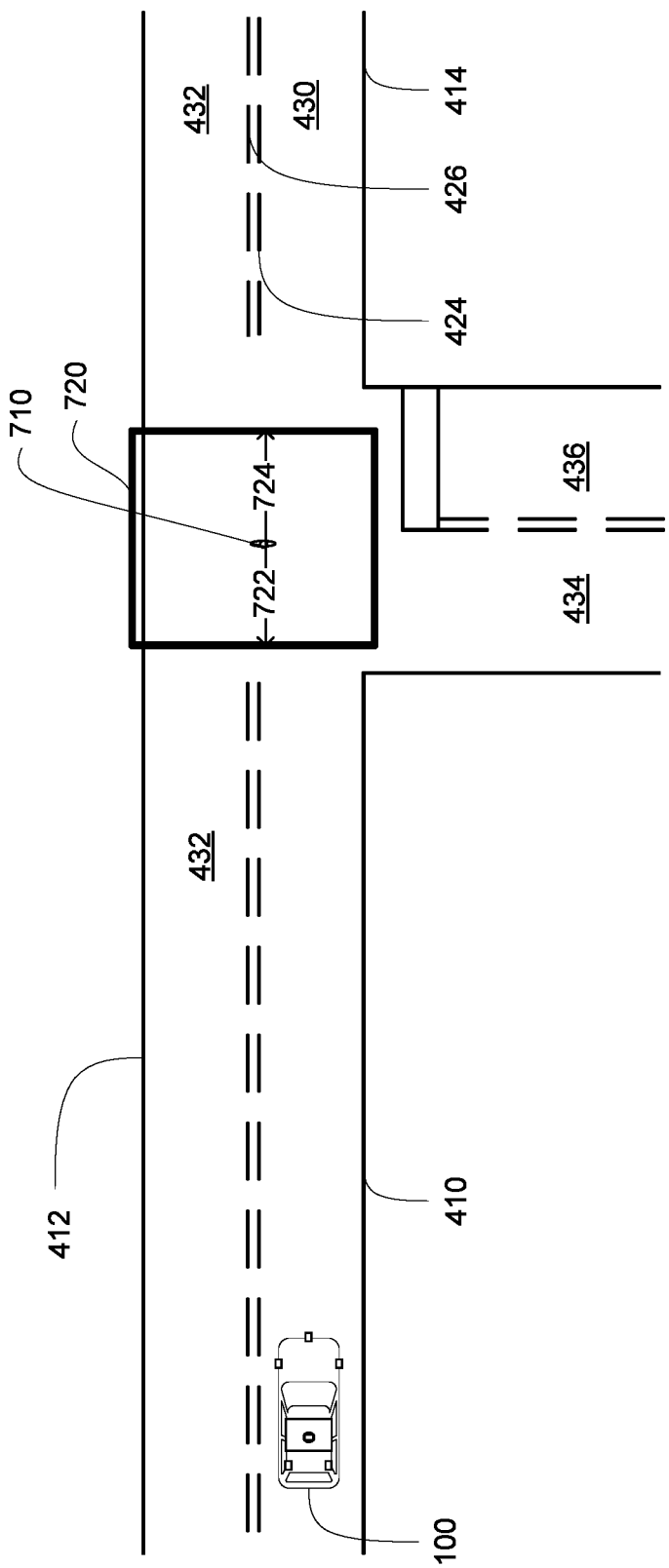
Figure 7C:
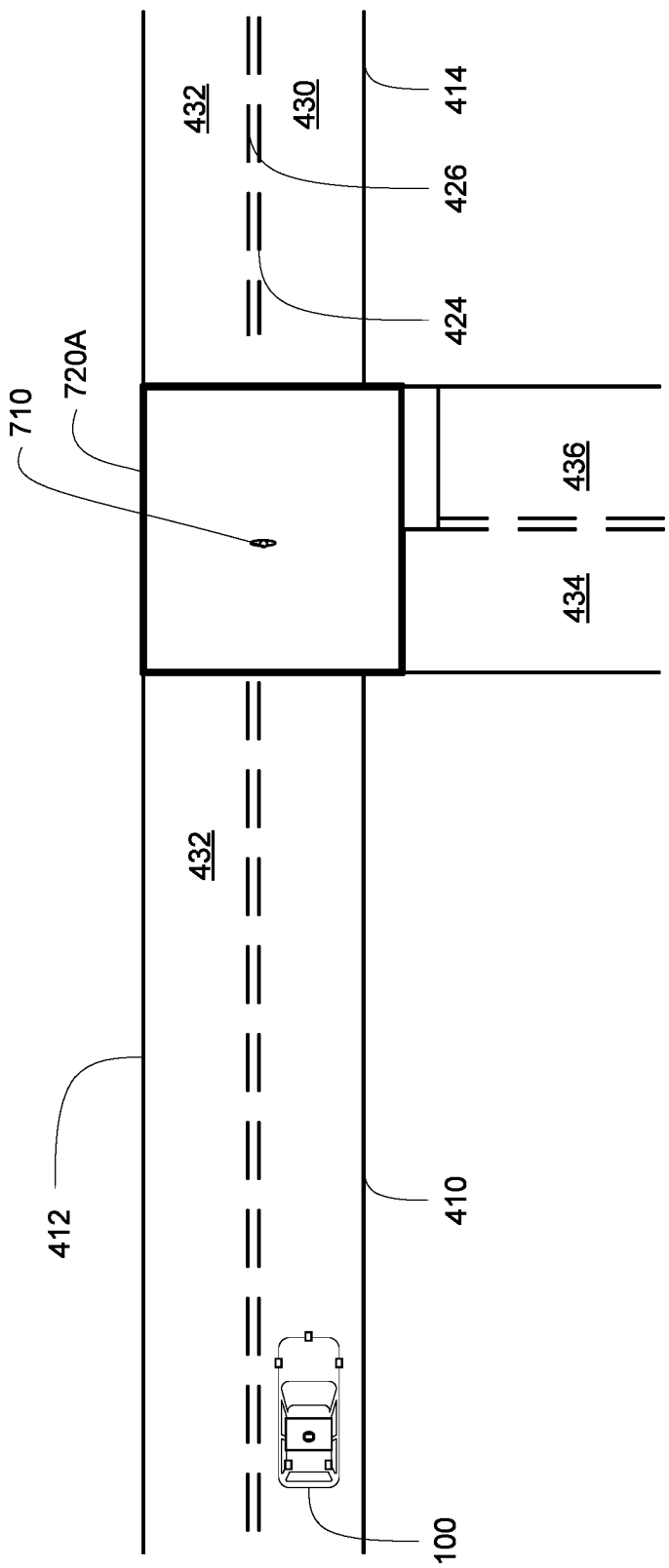

Returning to the example of FIG. 7A, as shown in FIG. 7B, area 720 may be determined by drawing a rectangle centered on the person directing traffic 710 and extending that rectangle across the width of lanes 430, 432. Arrows 722, 724 represent the particular width. In this example, the area 720 extends beyond the edges of the roadway defined by the fog lines 412, 414. Alternatively, as shown in FIG. 7C, area 720A corresponds to the entire area of the intersection 402.

As another instance, in an area of a traffic accident, such as where a collision may recently have occurred, pedestrians may be more likely to be walking around. As such, the area for the unmarked crosswalk may be identified to correspond to an entire area of an accident zone or an area that is some predetermined distance larger than the area of the accident zone. Such accident zones may be identified as a polygon by another detector of the vehicle which identifies areas for accident zones or by a remote computing device. For example, a remote assistance operator may "draw" a polygon in order to delineate an accident zone and this polygon may be sent to the vehicle over a network.

Returning to the example of FIG. 8, area 820 may be determined by drawing a rectangle centered on the traffic accident 810 and extending that rectangle across the width of lane 430. In this example, the area 820 extends beyond the edges of the roadway defined by the fog lines 410 (though this is a consequence of the area of the traffic accident 810), 412.

As another instance, in areas where there is increased emergency vehicle activity, such as a group of police or fire trucks gathered together, pedestrians may be more likely to be walking around. As such, the area for the unmarked crosswalk may be identified to include all of the identified emergency vehicles plus some additional buffer area or distance, such as an additional 3-meter distance or more or less. Alternatively, distinct areas corresponding to a plurality of unmarked crosswalks may be identified as with the school bus examples above. In some instances, these areas may be connected to one another in order to identify a larger area for the unmarked crosswalk.

Figure 9B:
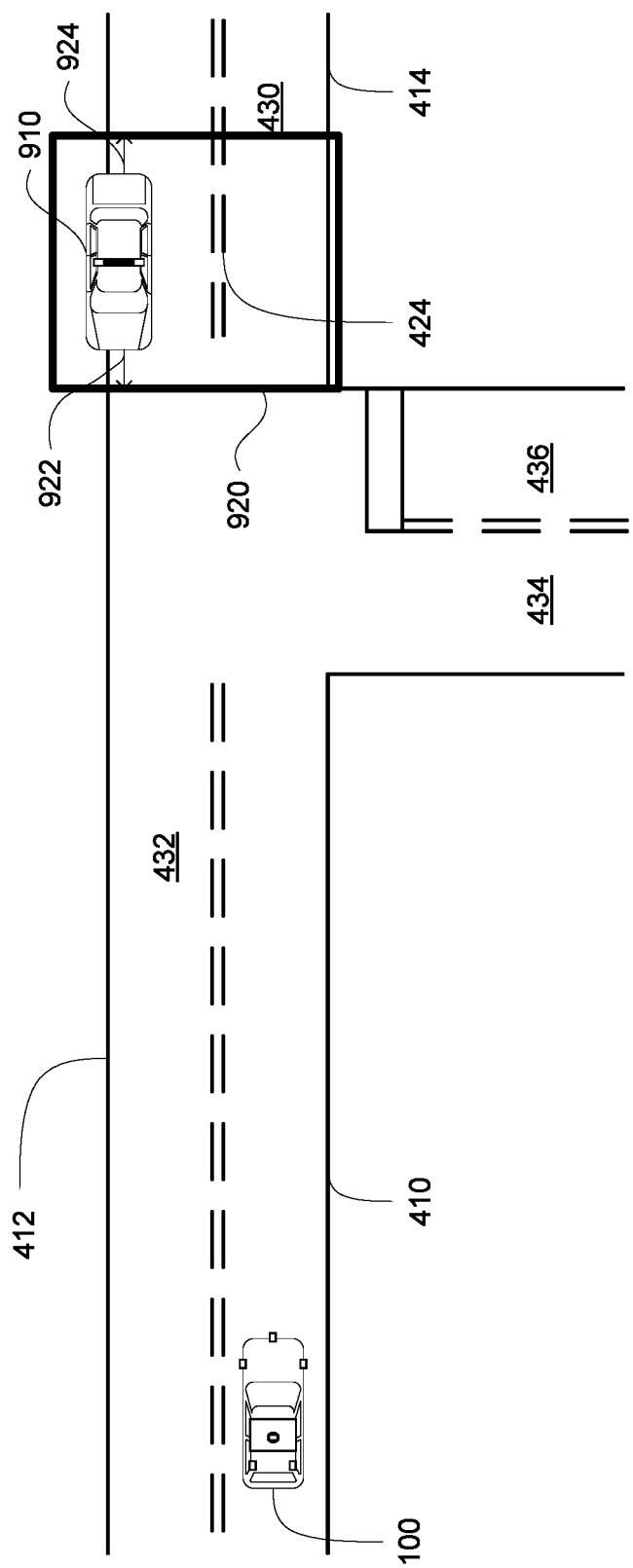

Returning to the example of FIG. 9A, as shown in FIG. 9B, an area 920 may be determined by drawing a rectangle centered on the emergency vehicle 910 and including some buffer area around the emergency vehicle, and extending that rectangle across the width of lanes 430, 432. Arrows 922, 924 represent the additional buffer distance. In this example, the area 920 extends beyond the edges of the roadway defined by the fog lines 410 (though this is a consequence of the area of the emergency vehicle 910), 412.

As another instance, in residential areas, larger parking lots, and other low-speed areas, pedestrians often cross the road even in the absence of mapped or painted crosswalks, especially in situations in which a sidewalk continues to the edge of the road (e.g. There is a sidewalk curb cut). As such, the area for the unmarked crosswalk may be identified as the entirety of such areas. Returning to the example of FIG. 10, area 1020 may be determined to be the same as residential area 1010.

Returning to FIG. 3, at block 350, the vehicle is controlled in the autonomous driving mode based on the determination and the area. For instance, once an area for an unmarked crosswalk situation is determined, such as areas 520, 520A, 520B, 620, 720, 720A, 820, 920, 1020, certain behaviors for responding to crosswalks may be engaged, activated, or otherwise "turned on" in order to enable the vehicle 100 to react to the unmarked crosswalk as if it were an actual crosswalk. In other words, these behaviors may be used by the computing devices 110 to control the vehicle 100 as the vehicle approaches and passes through the areas 520, 520A, 520B, 620, 720, 720A, 820, 920, 1020.

One example behavior may include giving pedestrians precedence such that the vehicle 100 will react more strongly and is more likely to yield to pedestrians within or near (outside of) the area of the unmarked crosswalk. In addition, computing devices 110 may then cause the vehicle 100, for instance by changing parameters of the planning system 168, to maintain larger time and space buffers to pedestrians (as compared to situations in which a pedestrian is jaywalking or waiting near an edge of the road without intending to cross or walk along the edge of the road) while making trajectory determinations (e.g. geometry and speed). Another example behavior may include yielding to pedestrians waiting to cross a roadway such that the vehicle 100 may be more likely to stop for a pedestrian waiting on a side of the road to cross at or near the area of the unmarked crosswalk. Another example behavior may include occlusion reasoning. For example, the computing devices 110 may turn on occlusion reasoning such that the computing devices 110 may reason about occluded pedestrians who could enter and/or traverse the area of the unmarked crosswalk. The computing devices 110 may then cause the vehicle 100 to react appropriately to these occluded pedestrians. Another example behavior may include enabling invitation yielding. For example, the computing devices 110 may cause the vehicle 100 to be more likely to yield if the vehicle perception system 172 observes another vehicle yielding to some object within or near (outside of) the area of the unmarked crosswalk. Another example behavior may include allowing the vehicle 100 to spend more resources detecting, predicting, computing while approaching and passing through the identified area. This may include putting more computing power into analyzing images for pedestrians or even identifying objects as pedestrians even if otherwise the confidence is such identifications would be too low to do so.

The features described herein may enable an autonomous vehicle to identify situations in which pedestrians may be likely to be crossing, attempting to cross, or simply walking in a road. For instance, in certain situations such as near a school bus or school zone, pedestrians, including children, could come from occluded locations and otherwise be unexpected. In constructions zones, construction works may cross a roadway at various locations. When persons are directing traffic, pedestrians may be more likely to cross the road outside of a crosswalk, and especially at events such as concerts or sporting events. In areas where a collision may have recently occurred or where there is increased emergency vehicle activity (such as a group of fire trucks, ambulances or police vehicles), pedestrians may be more likely to cross a roadway. Also in residential or other low-speed areas, pedestrians may also tend to cross roadways and even intersection in the absence of crosswalks. The features described herein may allow an autonomous vehicle to automatically engage certain behaviors useful for crosswalks in instances where such behaviors would be safer, more helpful, and appropriate even if not legally required. Overall, the features described herein may greatly improve safety in situations where pedestrians could be or are crossing a road outside of a crosswalk.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling a vehicle having an autonomous driving mode, the method comprising:
receiving, by one or more processors of the vehicle, sensor data generated by a perception system of a vehicle, the sensor data identifying objects in an environment of the vehicle;
receiving, by the one or more processors of the vehicle, a trajectory corresponding to a future path of the vehicle;
determining, by the one or more processors of the vehicle, that the vehicle is approaching an unmarked crosswalk situation based on the trajectory and the sensor data;
in response to the determination, identifying, by the one or more processors of the vehicle, an area corresponding to an unmarked crosswalk based on a type of the unmarked crosswalk situation; and
controlling, by the one or more processors of the vehicle, the vehicle in the autonomous driving mode based on the determination and the area.

2. The method of claim 1, wherein the unmarked crosswalk situation corresponds to a situation in which there is no marked crosswalk in the environment.

3. The method of claim 1, wherein the unmarked crosswalk situation corresponds to a situation in which there is no marked crosswalk in any pre-stored map information used to control the vehicle in the autonomous driving mode.

4. The method of claim 1, wherein determining that the vehicle is approaching an unmarked crosswalk situation includes determining whether the environment includes a school zone.

5. The method of claim 1, wherein determining that the vehicle is approaching an unmarked crosswalk situation includes determining whether the environment includes a school bus.

6. The method of claim 5, wherein identifying the area is based on a location of the school bus.

7. The method of claim 1, wherein determining that the vehicle is approaching an unmarked crosswalk situation includes determining whether the environment includes a construction zone.

8. The method of claim 7, wherein identifying the area is based on a polygon of the construction zone.

9. The method of claim 1, wherein determining that the vehicle is approaching an unmarked crosswalk situation includes determining whether the environment includes one or more persons directing traffic.

10. The method of claim 9, wherein identifying the area is based on a location of the one or more persons directing traffic.

11. The method of claim 1, wherein determining that the vehicle is approaching an unmarked crosswalk situation includes determining whether the environment includes a traffic accident.

12. The method of claim 11, wherein identifying the area is based on a polygon for an accident zone of the accident.

13. The method of claim 1, wherein determining that the vehicle is approaching an unmarked crosswalk situation includes determining whether the environment includes one or more emergency vehicles.

14. The method of claim 13, wherein identifying the area is based on a location of a first of the one or more emergency vehicles.

15. The method of claim 14, further comprising identifying a second area based on a location of a second of the one or more emergency vehicles, and wherein controlling the vehicle is further based on the second area.

16. The method of claim 1, wherein controlling the vehicle includes giving a pedestrian in an area precedence for crossing a road with respect to the vehicle.

17. The method of claim 1, wherein controlling the vehicle includes yielding to a pedestrian on a side of a road outside of the area.

18. The method of claim 1, wherein controlling the vehicle includes using occlusion reasoning for the area in order to predict one or more potentially occluded pedestrians.

19. The method of claim 1, wherein controlling the vehicle includes allowing the vehicle's computing devices to increase allocation of computing resources for detecting and responding to pedestrians as the vehicle approaches the area.

20. A vehicle having an autonomous driving mode, the vehicle comprising:
a perception system; and
a computing device including one or more processors configured to:
receive sensor data generated by the perception system, the sensor data identifying objects in an environment of the vehicle;
receive a trajectory corresponding to a future path of the vehicle;
determine that the vehicle is approaching an unmarked crosswalk situation based on the received trajectory and the sensor data;
in response to the determination, identify an area corresponding to an unmarked crosswalk based on a type of the unmarked crosswalk situation; and
control the vehicle in the autonomous driving mode based on the determination and the area.

21. The vehicle of claim 20, wherein the unmarked crosswalk situation corresponds to a situation in which there is no marked crosswalk in any pre-stored map information used to control the vehicle in the autonomous driving mode.

* * * * *